G. H. VOGEL.
MILK CAN SAFETY DEVICE.
APPLICATION FILED SEPT. 25, 1918.

1,302,459.

Patented Apr. 29, 1919.

WITNESSES
Arthur Nisch
A. L. Kitchin

INVENTOR
George H. Vogel
BY
ATTORNEYS

UNITED STATES PATENT OFFICE.

GEORGE HENRY VOGEL, OF BROOKLYN, NEW YORK.

MILK-CAN SAFETY DEVICE.

1,302,459. Specification of Letters Patent. Patented Apr. 29, 1919.

Application filed September 25, 1918. Serial No. 255,596.

*To all whom it may concern:*

Be it known that I, GEORGE H. VOGEL, a citizen of the United States, and a resident of the city of New York, borough of Brooklyn, in the county of Kings and State of New York, have invented a new and Improved Milk-Can Safety Device, of which the following is a full, clear, and exact description.

This invention relates to a safety device for milk can covers and has for an object the provision of an improved arrangement whereby the lid is locked in position.

Another object of the invention is the provision of an improved combined locking and safety device for milk cans whereby when the device is operated the lid will be locked in place and also be prevented from entering the neck of the can too far.

Figure 1:
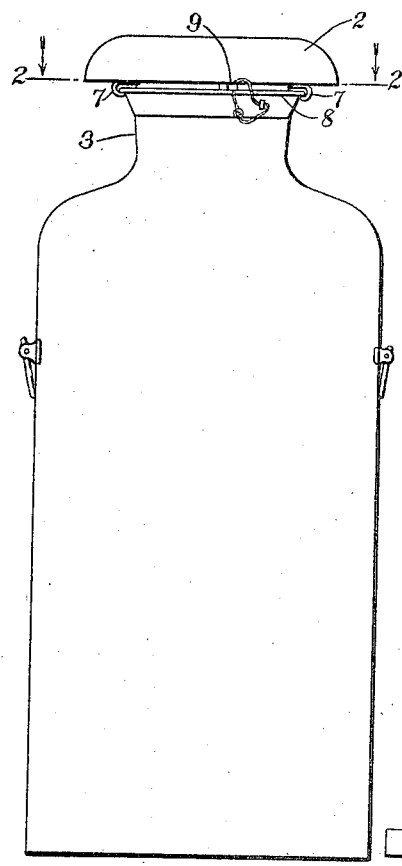
Figure 1 is a side view of a milk can and safety device illustrating the invention and the way the same is applied.

Referring to the accompanying drawing by numerals 1 indicates an ordinary milk can and 2 an ordinary cover therefor. The can 1 is provided with a neck 3 slightly tapering, which is the ordinary construction for cans of this kind, said neck accommodating the slightly tapering section 4 of the lid 2. These tapering or frustoconical shaped sections are formed in this manner so as to produce a tight joint when the lid is in place. However, in placing the lid in place very often the neck 3 becomes expanded, especially where the lid 2 is forced thereon as far as possible. In this way the neck becomes too large for the lid and consequently the lid falls off easily.

Figure 2:
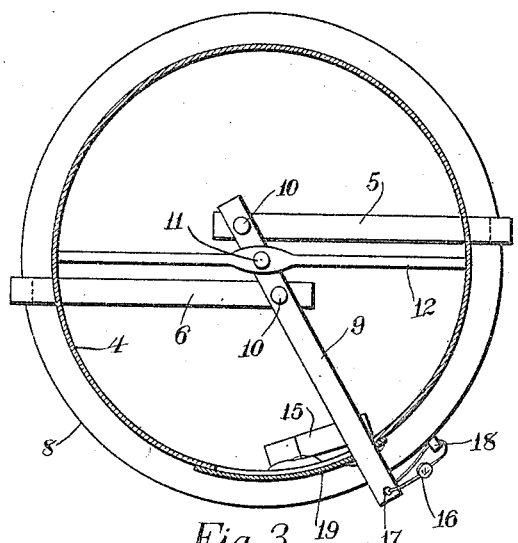
Fig. 2 is a section through Fig. 1 on line 2—2.
Figure 3:
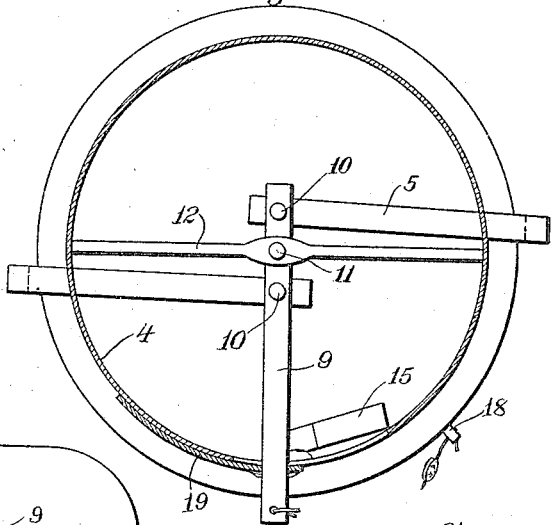
Fig. 3 is a sectional view similar to Fig. 2 but showing the parts in an unlocked position.
Figure 4:
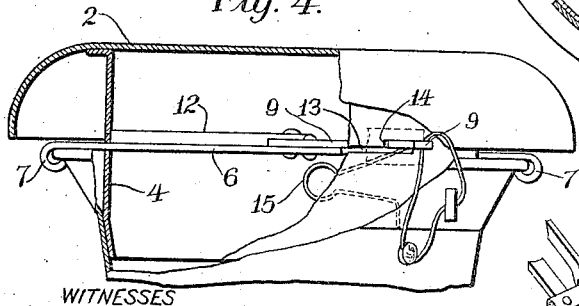
Fig. 4 is a side view of the upper part of the can shown in Fig. 1 with the lid in position and certain parts broken away for illustrating the position and action of the various parts.
Figure 5:
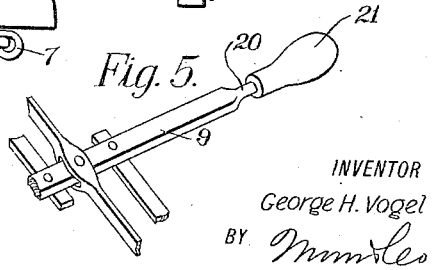
Fig. 5 is a detail fragmentary perspective view showing a slightly modified arrangement of operating lever.

The present invention has for one of its objects to present means which will prevent the lid from being forced into the neck 3 at too great an extent, while at the same time presenting a locking means to prevent accidental or unauthorized removal. The locking device consists of a pair of locking bolts 5 and 6 slidingly extending through the tapering section 4 of top 2, there being provided suitable apertures for these bolts. The ends of the bolts are provided with hooks 7 as shown in Fig. 4 so as to hook over the flange 8 of neck 3. An operating lever 9 is pivotally connected at 10 by bolts or any other suitable means to the locking bars or bolts 5 and 6, said lever 9 being pivotally mounted at 11 to a supporting cross bar 12. The cross bar 12 is provided with a reduced end extending through the tapering section 4 as indicated in Fig. 3 and is preferably upset or riveted so that the bar 5 will be held in proper place. The lever 9 extends through a slot 13 which has an offset 14 into which a spring 15 forces the lever when the lever or bar is moved to its locked position as shown in Fig. 2. If desired a seal 16 may be used for preventing unauthorized unlocking of the lever 9. An aperture 17 is provided in the lever and a suitable lug 18 is provided on the can or on the lid 2 as preferred for receiving the seal. In order to maintain the can closed notwithstanding the slot 13 a covering plate 19 is soldered or otherwise rigidly secured to lever 9 as shown in Fig. 2, said covering plate being of proper size to cover the entire slot when the lever 9 is in a locked position. Ordinarily the lever 9 does not project beyond the lid 2 and is shaped as shown in Fig. 2 so as to be readily operated by the hand. If desired the lever could be made shorter or longer, though it must project through the slot 13. When the lever is made shorter it is preferably provided with a reduced portion 20 on which a handle 21 is removably positioned. The reduced portion 20 may be round, square or other shape and the socket in the handle 21 would be a corresponding shape so that one or more handles may be provided at the place of delivery as well as at the place of shipping. This will prevent an unauthorized trainman or other person from unlocking the lid.

The arrangement of the locking bars or bolts 5 and 6 so as to rest on top of the flange or bead 8 acts as a support for lid 2 for preventing the lid from being forced into the neck 3 to too great a distance, though a sufficient distance to produce a tight connection. In this way both the lid and the neck of the can are preserved in proper shape for sealing the can while the lid is held in place even though the can should fall over sidewise or be placed upside down. The use of the bolts 5 and 6 as means for supporting the lid as well as locking the lid down is especially important where considerable shipments are being made, as it is customary to stack the cans and the weight of the cans will naturally force the lids of the lower cans farther and farther into the neck of the respective cans. The locking structure therefore operates in the double capacity of preventing injury to the can and preventing loss by an unauthorized opening, or by accidental removal of the lid when the can is accidentally knocked over.

What I claim is:

1. A safety device for milk cans comprising a locking structure mounted on the lid of the can and interlocking with the bead on the top of the can, said locking device comprising a plurality of bolts having hook members interlocking with said bead, a pivotally mounted actuated lever for moving said bolts longitudinally, said lid having a slot formed with a notch, said slot being adapted to receive said locking lever, and a spring acting on said lever for forcing the same into said notch when moved to a locked position.

2. In a safety device for milk cans the combination with a can and a cover therefor provided with a slot having a notch, of a supporting bar connected to said cover, a locking lever pivotally mounted on said supporting bar, a pair of sliding bolts pivotally connected to said locking bar, said bolts being mounted on opposite sides of said supporting bar and extending through part of said cover, each of said bolts having hooked ends for hooking on the top flange of the can, and a spring for forcing said locking lever into said notch when the bolts are in a locked position.

3. In a device of the character described the combination with a milk can and cover, of a pair of locking bars mounted in said cover formed with hooked ends, said locking bars resting on the top of the milk can and the hooked ends interlocked with the top bead of said can whereby the cover cannot be moved upwardly or downwardly, and means for holding said locking bars in a locked position.

GEORGE HENRY VOGEL.